UNITED STATES PATENT OFFICE.

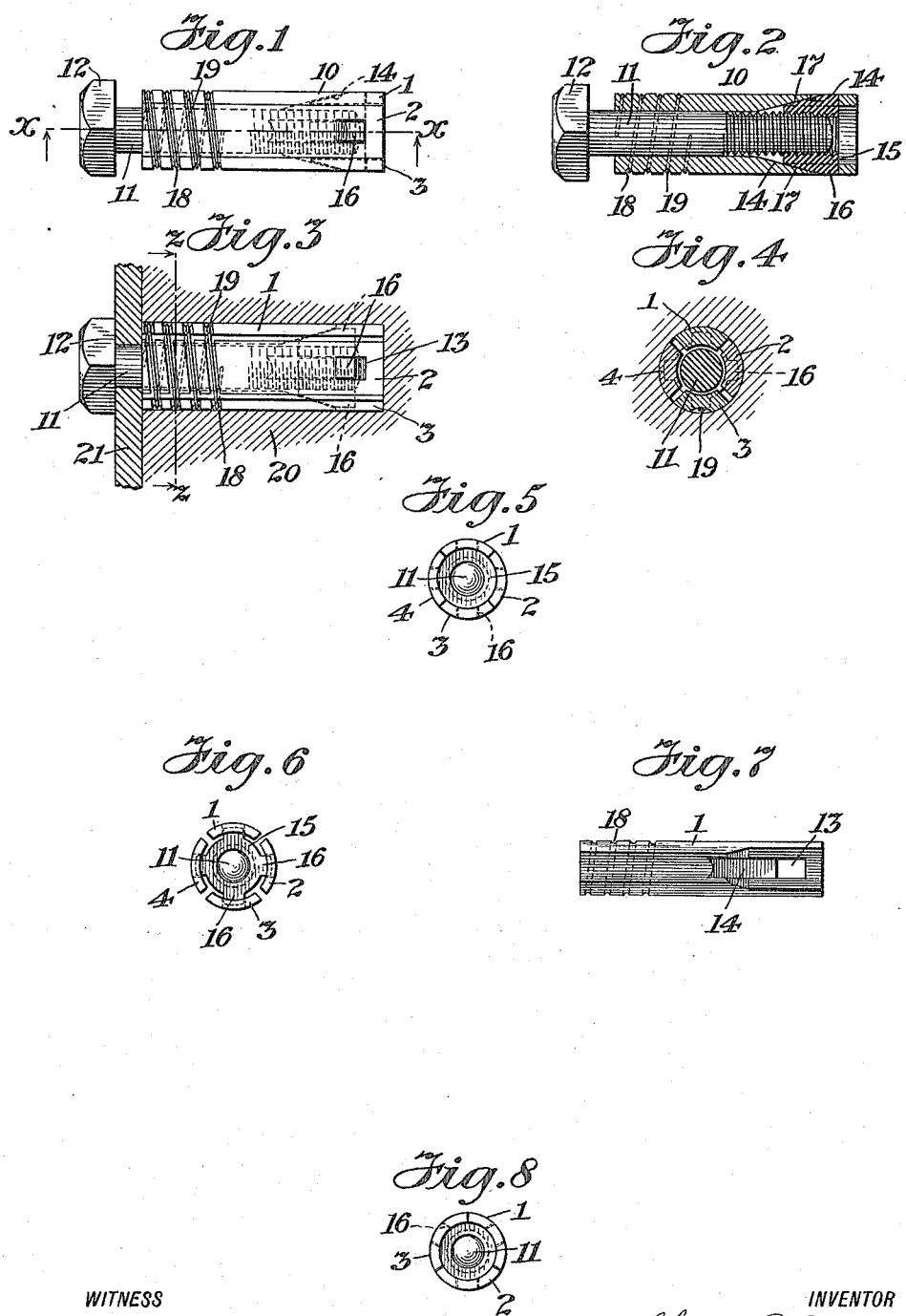

CHARLES J. CLEMENTS, OF NEW YORK, N. Y.

EXPANSION-BOLT.

1,161,617.  Specification of Letters Patent.  Patented Nov. 23, 1915.

Application filed April 26, 1915. Serial No. 23,875.

*To all whom it may concern:*

Be it known that I, CHARLES J. CLEMENTS, a citizen of the United States, residing in the borough of Brooklyn, in the county of Kings, city and State of New York, have invented an Improvement in Expansion-Bolts, of which the following is a specification.

My present invention relates to devices commonly termed "expansion-bolts," for use in marble, stone, brickwork, cement, and like substances.

The object of my invention is to provide a device of this character that when operated within a hole or recess drilled in a solid material, the expansion of the segmental tube will give a uniform circumferential bearing the entire length of the tube within the hole or recess.

The details of the invention are hereinafter particularly described.

In the accompanying drawing: Figure 1 is a longitudinal elevation of my invention with the parts in their normal positions. Fig. 2 is a section on the broken line $x$, $x$, of Fig. 1. Fig. 3 illustrates the device inserted within a hole drilled in a solid substance, the tube being shown expanded. Fig. 4 is a section on the broken line $z$, $z$, of Fig. 3. Fig. 5 is a rear end view of the device with the parts in their normal positions. Fig. 6 is a rear end view with the tube expanded. Fig. 7 is an interior view of one of the tube segments, and Fig. 8 is a rear end view of the tube composed of three segments.

Similar reference characters denote the same parts throughout the several views.

10 indicates a tube of any desired length and diameter.

11 designates a bolt, screw-threaded at one end and provided with a head 12 at the other end. The tube 10 surrounds this bolt, the body of which closely fits the interior of the tube. The tube is divided longitudinally into a plurality of sections of equal size. I prefer to divide it into four sections, 1, 2, 3, 4, although it may be divided into three sections only, as shown in Fig. 8. Each segment of the tube is provided adjacent one end with an opening 13. These openings are preferably approximately square, and the inner surface of each tube section has a beveled groove 14 extending from the opening 13 to a predetermined point toward the center of the tube.

15 indicates a screw-threaded nut provided with spaced parallel ribs or lugs 16. These lugs have a beveled top portion 17 which extends from a predetermined distance from the rear of the nut to its other end. The upper surface of each lug 16 thus has a short rear portion parallel with the outer surface of the nut between the lugs, which portion when the nut and tube sections are assembled in a normal condition fit into the opening 13 in the respective sections of the tube 10, and are flush with the outer surface of the tube; the beveled portions of the top surfaces of the lugs 16 fit into the oppositely beveled grooves 14 on the inner surfaces of the tube sections, with the sides of the lugs bearing against the sides of the grooves 14 in the tube sections, which when the nut is drawn forward, as hereinafter described, form guides for the lugs and prevent any lateral motion of the nut. The interior diameter of the tube 10, at the rear end, is slightly enlarged so that the screw-threaded opening in the nut 15 normally registers with the main bore of the tube in diameter. In order to hold the tube sections together, with the nut in the position just described, I form a spiral groove 18, in the outer surface of the tube 10, to receive a spiral spring 19. The groove is made deep enough so that the spring will be sunk below the surface of the tube at all times. With the tube segments and nut thus assembled, the tube is inserted into a recess or hole drilled in a solid substance 20; the hole being of larger diameter than the diameter of the tube in its normal condition. The screw threaded end of the bolt 11 is passed through a hole in a plate 21 or any article to be attached to or supported from or upon the substance 20 and is then screwed into the nut 15. Upon continuing the rotation of the bolt to the right, the screw-threaded nut 15 will be drawn forward, the beveled lugs 16 sliding in the oppositely beveled grooves 14 on the inner surfaces of the respective tube sections gradually and uniformly expanding the tube 10 its entire length, so that a uniform circumferential bearing the entire length of the tube within the recess or hole is obtained, rendering it impossible for the tube to become loose or the bolt to be withdrawn without intentionally releasing the grip.

I claim as my invention:

1. A device of the character described, comprising a tube divided longitudinally into a plurality of sections, each section at a corresponding point on its inner surface having a beveled longitudinal groove and an opening adjacent one end and to which said groove extends, a screw threaded nut provided on its outer surface with spaced ribs beveled on a portion of their top surface which ribs fit and slide in said grooves in the tube sections, and a bolt within said tube by means of which the nut may be drawn forward to expand the tube sections.

2. A device of the character described, comprising a tube divided longitudinally into a plurality of sections, each section at a corresponding point on its inner surface having a beveled longitudinal groove and an opening adjacent one end and to which said groove extends, a screw threaded nut provided on its outer surface with spaced ribs parallel on their top surfaces for a short distance from their rear ends and beveled therefrom toward the forward ends, said parallel portions fitting into said openings in the tube sections when the tube is in a normal condition, and a bolt within said tube by means of which the nut may be drawn forward to expand the tube sections.

3. A device of the character described, comprising a tube having a smooth straight bore approximately one half its length and divided longitudinally into a plurality of sections, each section at the point of termination of the straight bore being slightly cut away on its interior and provided with an opening adjacent one end and having a centrally located beveled groove extending from the point of termination of said straight bore to said opening, a screw threaded nut provided on its outer surface with spaced ribs parallel on their top surfaces for a predetermined distance from one end and beveled therefrom toward their other end, said parallel portions fitting into said openings when the tube is in a normal condition, and a bolt passing through the straight bore of the tube in loose contact therewith and engaging said nut by means of which the said tube sections may be expanded.

4. A device of the character described, comprising a tube having a spiral groove in its outer surface and divided longitudinally into a plurality of sections, each section at a corresponding point on its inner surface having a beveled longitudinal groove and an opening adjacent one end into which said groove terminates, a spiral spring fitted into said spiral groove in the outer surface of the tube, a screw threaded nut provided on its outer surface with spaced longitudinal ribs beveled on a portion of their top surfaces which ribs fit and slide in said beveled grooves in the tube sections, and a bolt within said tube engaging said nut by means of which said tube may be expanded.

5. A device of the character described, comprising a tube having a spiral groove in its outer surface and divided longitudinally into a plurality of sections, each section at a corresponding point on its inner surface having a beveled longitudinal groove and an opening adjacent one end in which said groove terminates, a spiral spring fitted into said spiral groove in the outer surface of the tube, a screw threaded nut provided on its outer surface with spaced longitudinal ribs parallel on their top surfaces for a predetermined distance from one end and beveled therefrom toward their other ends, said parallel portions fitting in said openings in the tube sections when the tube is in a normal condition the beveled portions of said rib fitting in said grooves extending from said opening and slidable therein, and a bolt within said tube engaging said nut by means of which said tube may be expanded.

Signed by me this 16th day of April, 1915.

CHARLES J. CLEMENTS.